United States Patent
Harada (10) Patent No.: US 6,766,465 B2
(45) Date of Patent: Jul. 20, 2004

(54) AUTOMATIC READ REASSIGNMENT METHOD AND A MAGNETIC DISK DRIVE

(75) Inventor: Masutaka Harada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/298,659

(22) Filed: Nov. 19, 2002

(65) Prior Publication Data

US 2003/0070109 A1 Apr. 10, 2003

Related U.S. Application Data

(63) Continuation of application No. 09/946,724, filed on Sep. 6, 2001, which is a continuation of application No. 09/630,735, filed on Aug. 2, 2000, now Pat. No. 6,393,580.

(51) Int. Cl.[7] .............................................. G06F 11/00
(52) U.S. Cl. ............................... 714/2; 714/8; 711/133
(58) Field of Search ............................... 714/2, 6, 7, 8, 714/39, 42, 44, 47, 54, 770, 819; 711/133, 159

(56) References Cited

U.S. PATENT DOCUMENTS

| | | | |
|---|---|---|---|
| 4,998,357 A | 3/1991 | Farnung et al. | 64/222.81 |
| 5,481,670 A | 1/1996 | Hatashita et al. | |
| 5,555,390 A | 9/1996 | Judd et al. | 711/112 |
| 5,615,335 A | 3/1997 | Onffroy et al. | 714/30 |
| 5,721,816 A | 2/1998 | Kusbel et al. | 714/15 |
| 5,764,881 A | 6/1998 | Yoshida | 714/8 |
| 5,787,460 A | 7/1998 | Yashiro et al. | 711/114 |
| 5,808,825 A | 9/1998 | Okamura | 360/75 |
| 5,828,583 A | 10/1998 | Bush et al. | 702/185 |
| 6,088,818 A | 7/2000 | Andoh et al. | 714/703 |
| 6,134,631 A | 10/2000 | Jennings, III | 711/117 |
| 6,233,108 B1 | 5/2001 | Inoue | 360/53 |
| 6,239,931 B1 | 5/2001 | Chung et al. | 360/53 |
| 6,263,459 B1 | 7/2001 | Schibilla | 714/710 |
| 6,279,089 B1 * | 8/2001 | Schibilla et al. | 711/162 |
| 6,289,483 B1 | 9/2001 | Ohtaki | 714/769 |
| 6,330,641 B1 * | 12/2001 | Yoshioka | 711/113 |
| 6,384,999 B1 | 5/2002 | Schibilla | 360/53 |
| 6,393,580 B1 * | 5/2002 | Harada | 714/2 |
| 6,513,135 B2 * | 1/2003 | Harada | 714/42 |
| 6,625,755 B1 * | 9/2003 | Hirata et al. | 714/17 |

FOREIGN PATENT DOCUMENTS

| | | |
|---|---|---|
| EP | 0474451 | 3/1992 |
| JP | 4266117 | 9/1992 |
| JP | 675717 | 3/1994 |
| JP | 8180612 | 7/1996 |

* cited by examiner

*Primary Examiner*—Nadeem Iqbal
(74) *Attorney, Agent, or Firm*—Antonelli, Terry, Stout & Kraus, LLP

(57) ABSTRACT

An automatic replacing method is applicable to a magnetic disc drive used particularly in reading data. When a sign that a unit (sector) at which information is handled may be defective at the time of a reading error is detected (saving threshold), the information in that unit is temporarily stored (saved) in a temporary storage area (backup area). If the unit showing the sign is judged to be definitely defective, the information in that unit is transferred to a safe storage area (replacement area). Thus, fatal reading errors and negligible reading errors can be treated separately.

11 Claims, 11 Drawing Sheets

FIG.1

FIG.2 back up data table
(In case that maximum number of registration is 5)

| address to be backed up | back up address | accumulated number of retries | prioity |
|---|---|---|---|
| address A11 | address C01 | 30 | 2 |
| address A12 | address C02 | 20 | 3 |
| address A13 | address C03 | 35 | 1 |
| address A14 | address C04 | 10 | 5 |
| address A15 | address C05 | 11 | 4 |

| address to be backed up | back up address | accumulated number of retries | priority |
|---|---|---|---|
| A01 | C01 | 10 | 1 |
| A02 | C02 | 5 | 2 |
| — | C03 | — | — |
| — | C04 | — | — |
| — | C05 | — | — |

| | | | |
|---|---|---|---|
| 51 | 52 | 53 | 54 |

⬆ 5 retries occurred at address A03

| address to be backed up | back up address | accumulated number of retries | priority |
|---|---|---|---|
| A01 | C01 | 10 | 1 |
| A02 | C02 | 5 | 3 |
| A03 | C03 | 5 | 2 |
| — | C04 | — | — |
| — | C05 | — | — |

FIG.6

| address to be backed up | back up address | accumulated number of retries | priority |
|---|---|---|---|
| A01 | C01 | 30 | 1 |
| A02 | C02 | 6 | 2 |
| A03 | C03 | 20 | 3 |
| A04 | C04 | 6 | 5 |
| A05 | C05 | 6 | 4 |

⬆ 5 retries occurred at address A06

| address to be backed up | back up address | accumulated number of retries | priority |
|---|---|---|---|
| A01 | C01 | 30 | 1 |
| A02 | C02 | 10 | 3 |
| A03 | C03 | 20 | 2 |
| A06 | C04 | 5 | 5 |
| A05 | C05 | 6 | 4 |

FIG.7

| address to be backed up | back up address | accumulated number of retries | priority |
|---|---|---|---|
| A01 | C01 | 30 | 1 |
| A02 | C02 | 10 | 3 |
| A03 | C03 | 20 | 2 |
| A04 | C04 | 6 | 5 |
| A05 | C05 | 6 | 4 |

5g 5 retries occurred at address A02

5h

| address to be backed up | back up address | accumulated number of retries | priority |
|---|---|---|---|
| A01 | C01 | 30 | 1 |
| A02 | C02 | 20 | 2 |
| A03 | C03 | 20 | 3 |
| A04 | C04 | 6 | 5 |
| A05 | C05 | 6 | 4 |

| address to be backed up | back up address | accumulated number of retries | priority |
|---|---|---|---|
| A01 | C01 | 30 | 1 |
| A02 | C02 | 10 | 3 |
| A03 | C03 | 20 | 2 |
| A04 | C04 | 6 | 5 |
| A05 | C05 | 6 | 4 |

5j alternation processing executed at address A03

5k

| address to be backed up | back up address | accumulated number of retries | priority |
|---|---|---|---|
| A01 | C01 | 30 | 1 |
| A02 | C02 | 10 | 2 |
| — | C03 | — | — |
| A06 | C04 | 6 | 4 |
| A05 | C05 | 6 | 3 |

AUTOMATIC READ REASSIGNMENT METHOD AND A MAGNETIC DISK DRIVE

The present application is a continuation of application Ser. No. 09/946,724, filed Sep. 6, 2001; which is a continuation of application Ser. No. 09/630,735, filed Aug. 2, 2000, now U.S. Pat. No. 6,393,580, the contents of which are incorporated herein by reference.

FIELD OF THE INVENTION

The present invention relates to magnetic disk drives of the type used for information storage in electronic computer systems, including personal computers and work stations, and especially to an automatic reassignment function that improves the reliability of storage data.

BACKGROUND OF THE INVENTION

Generally, with the increase in the storage capacity of a data storage device that operates as peripheral equipment in a computer system, the reliability of stored data has become more and more important.

When computer systems read data from or write data to a unit on a data storage media, a read unable error or a write unable error often occurs for some unknown reason. The result of these kinds of errors is that data cannot be read out in spite of the receipt of a read instruction from an upper system, or data is found to be abnormally written when reading the data after a write operation that responds to a write instruction from the system.

In these cases, as one of the methods of improving the data reliability in a data storage, an automatic reassignment scheme has been adopted. Here, an automatic reassignment is defined as a technique in which a copy of a recorded unit of data (for example, sectors on a track on magnetic disk media in a magnetic disk drive) is prepared beforehand in a data storage, separately from the set of the recording unit of data, and the copy is used instead of the original, if necessary.

The probability of occurrence of data errors in magnetic disk drives of the type that are used as external memory devices is higher than that of conventional drives, since their recording densities are much higher and their total storage capacities have become much larger than ever. Therefore, in the magnetic disk drives for personal computers, an automatic reassignment function for sectors having defects (defective sectors) is generally adopted. And, if write errors occur, the data will be written to an alternative area. When read errors occur, by watching the number of retries and writing the data to the alternative area, the reliability of the data is improved.

It is important for any automatic reassignment technique to determine when to start execution of a read reassignment process with a suitable timing and how to secure the data integrity. Many different techniques have been proposed for these purposes. For example, as disclosed in a Japanese unexamined patent publication Hei 6-75717, entitled "Read error recovery system for a hard disk drive", a subtle or fine displacement between a magnetic head and a magnetic disk media is avoided by executing re-reading and writing of data to the same destination area, when a read error occurs, if the data is read normally before a number of the re-reading operations reaches a predetermined number. If the number of re-reading operations is equal to the predetermined number or more, an attempt is made to improve the reliability of the read data by executing the reassignment process to another area (to store the data to an alternative area). Hei 6-75717 discloses a system in which a re-read is executed when a read error occurs; and, if the data is read correctly before the number of re-reads reaches a predetermined number, the system writes the data to the same area.

If a subtle or fine displacement between a magnetic head and a magnetic disk media is the cause of an error, an execution of repeated data write operations may be effective. But if an error is caused by the existence of an infinitesimal bad spot (an infinitesimal defective region) on a sector, that is, by media defects, there is a tendency to repeat the retry of a read operation even though the write operation has been performed normally.

SUMMARY OF THE INVENTION

The present invention applies an automatic reassignment technique, especially at the time of a read operation, to a magnetic disk drive and performs the following controls.

The present invention proposes to determine a symptom of a unit that handles data, which symptom is the cause of a failure resulting in the occurrence of a read error on the unit, and the data of the unit is temporarily stored (back up process) in a temporary storing area (back up area). If the symptom of the failure is considered to represent a definite failure, the data of the unit is shifted to a safe storing area (alternation area). As a result, a fatal read error and a temporary read error are treated differently.

In other words, a priority level of candidates among data to be shifted to the alternation area is determined dynamically by referring to the number of retry operations related to the read errors. The unit of data is stored in the temporary storing area, which is a back up area, based on the state of the accumulated number of retries after the temporary storing, time stamps of data and so on.

The present invention does not renew directly the data content of an area, or a unit or a sector to handle data when a normal read is performed before the number of retries reaches a predetermined number, as in the conventional technology. In accordance with the present invention, under such circumstances, a data write command is not executed to the area, the unit, nor the sector to handle the data. Rather, the content of data is held in a back up area prepared in advance and is controlled using a back up data table. Concerning the unit that is judged to be definitely defective among the units of data held in the back up area, the content of the definitely-defective unit is transferred to the alternation area, and the reliability of stored data is improved even if a read error has occurred.

In the magnetic disk device that is provided with an automatic read reassignment function, 1) A back up area that holds the user data temporarily, an alternation area that serves as a substitute for the failed area or sectors, and a control area that stores control data are formed on a magnetic disk media in advance, in addition to the user data area that stores the data of the user (or the data of an electronic computer system) that uses the storage function of the magnetic disk device.

2) When a write command is accepted from a host (host processing unit or electronic computer system) to a sector where an error has occurred at the prior read processing, and the read processing is recovered by a retry processing, the data in the sector to be backed up (the sector that is read recovery processed) will be revised. At this time, the data is written (a duplicated writing of the same data) to the original sector and the back up area (more specifically, the sector in which data is held in the back up area).

3) For an error that occurs during read processing to a sector, a function to judge whether the sector has the symptom of a failure or not is provided and a back up process using a back up area is performed. That is, the back up process has a threshold value in the retry process in the read operation, and if the read operation is performed normally after a number of retries exceeding the threshold, the data of the sector is held in the back up area.

4) When the original sector cannot be read, the data at the back up sector is used.

5) The system has a function for judging that a sector is defective when an error has occurred in the process of a read operation for the sector and, in such case, for executing a reassignment process of the data to an alternation area. That is, in the retry processing of a read operation, a threshold value for the number of retries is provided, and when the number of the retries exceeds the threshold value, the sector is judged to be defective.

6) An alternation processing is controlled based on a reassignment data table including a reassigned address recording part that registers a defective sector address, and a reassigning address recording part that registers the address of the alternative storing sector which is used for the alternation of the defective sector.

7) The back up process is controlled by a back up data table having a backed up address recording part that registers addresses of sectors with the symptom of defects, a back up address recording part that registers temporary addresses of the sectors that store the data of the sectors with the symptom as a temporary storage, an accumulated number of retries recording part that records an accumulated number of retries, and a priority order recording part that controls a priority order of recording. Each registration in the back up data table is assigned a priority; for example, as the accumulated number of the retries is larger, the priority is higher. A newly found sector that has the symptom of a defect is registered without fail (the registering of defective sectors and other parameters are arbitrary to be registered) and the sectors accessed latest and with a larger accumulated number of retries are assigned a higher priority.

MOST PREFERRED EMBODIMENT FOR THE IMPLEMENTATION OF THE PRESENT INVENTION

FIG. 1 to FIG. 13 illustrates an embodiment for the implementation of the present invention.

Figure 3:
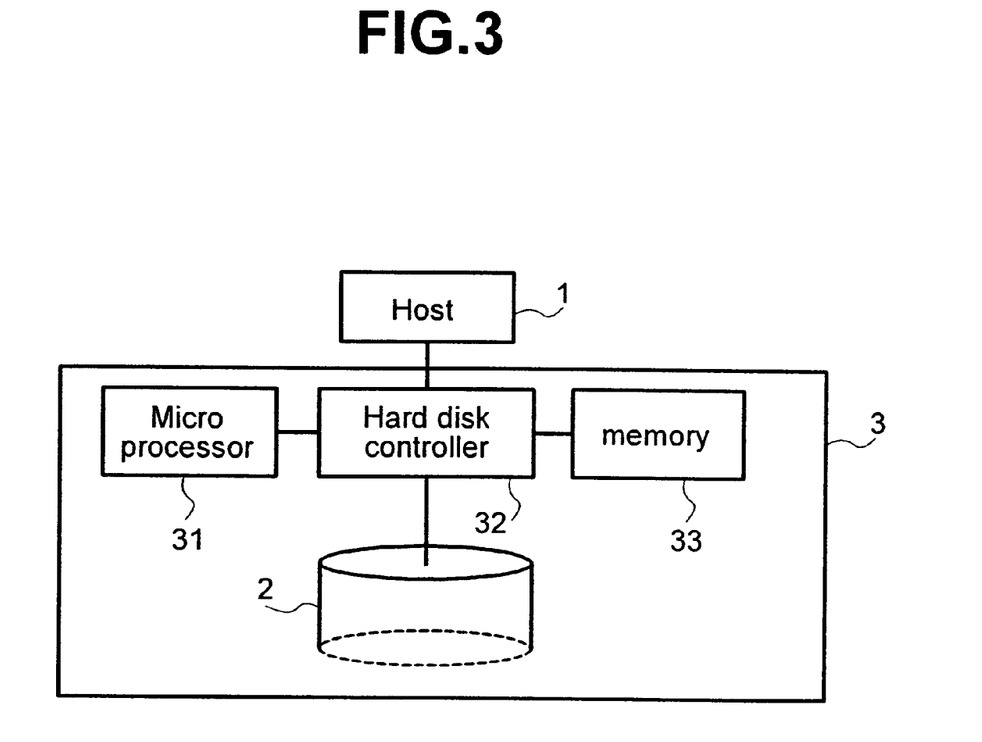
FIG. 3 is a block diagram of a host and a magnetic disk device that is integrated with a memory.

FIG. 3 shows an example of the configuration of a personal computer system that uses a magnetic disk device 3 integrated with a memory 33. The personal computer has a central processing unit or host computer 1 and the magnetic disk device 3 operating as an external memory device. This basic configuration can be employed where a host 1 is the host of a large computer system and the magnetic disk device 3 operates as an external memory device.

The magnetic disk device 3 comprises a microprocessor 31, a hard disk controller 32, a memory 33 and a disk unit (magnetic recording medium) 2. The microprocessor 31 controls the magnetic disk device 3. The hard disk controller 32 takes part in transmitting and receiving data and commands of the host 1 and the disk unit 2. The memory 33 has an area for holding data accessed from the host 1, an area to store an alternation data table 4 based on control data stored in the disk unit 2, and a back up data table 5.

Figure 4:
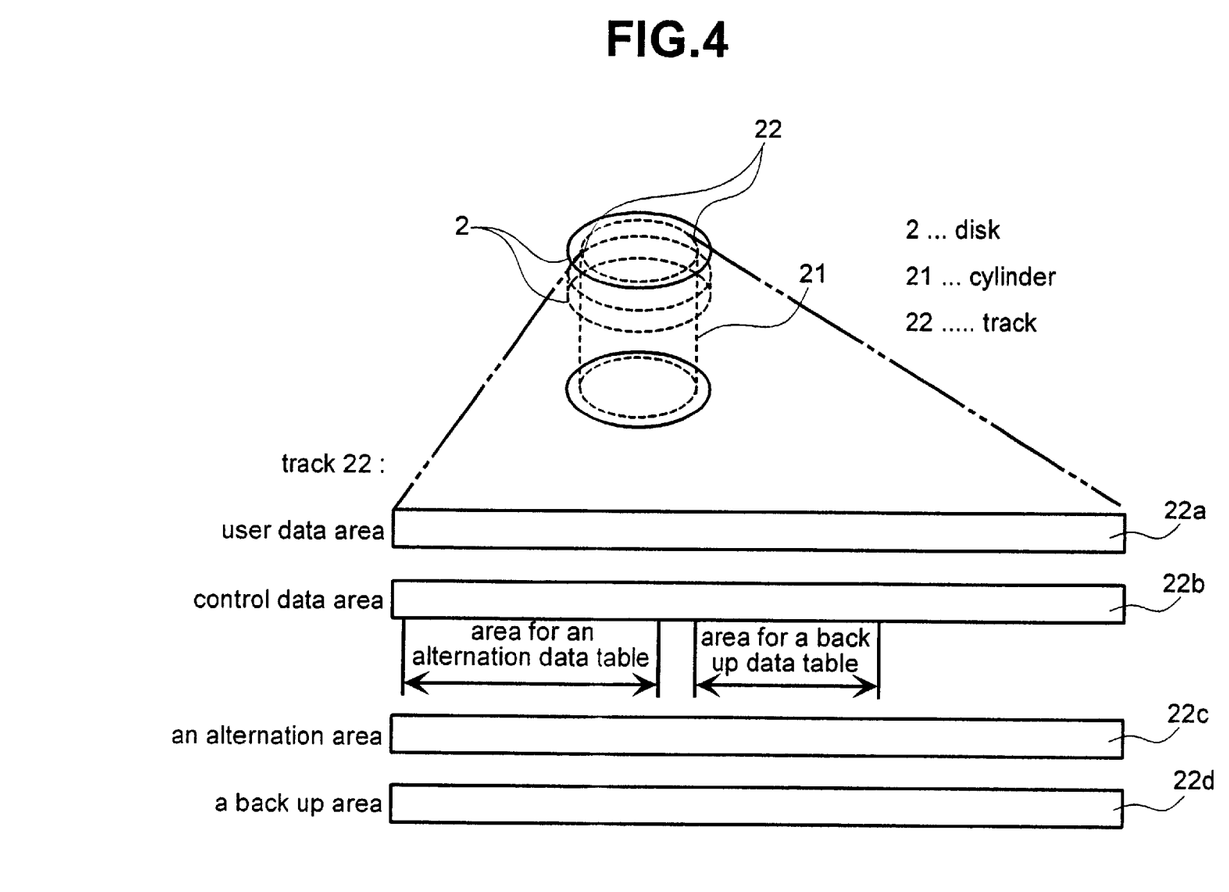
FIG. 4 is a diagram which shows a concept of each storage area on the magnetic disk media.

FIG. 4 shows the configuration of the disk unit 2. Tracks 22 are arranged in a concentric circular form on the both sides of the individual disks, which represents a plural recording medium. On each track 22, plural sectors that represent a kind of the recording units of the data are formed. On the both sides of each disk, magnetic heads, the distances of which from the rotational center of the disk are almost the same, move radially in the same direction at the same time on the disk surface to position the magnetic heads (seeking operation) on the objective track 22, and these magnetic heads are arranged facing the respective surfaces of the magnetic disks. Through the magnetic heads, the writing and reading of said sectors in any of the tracks 22 are performed. The track 22 has a user data area 22a, which the data is written to and read from, a control area 22b in which the alternation data table 4 and the back up data table 5 are stored, an alternation area 22c that stores the data produced in the alternation processing, and a back up area 22d that stores the backed up data in the back up processing.

Any access from the host 1 to a sector is executed by assigning addresses, such as cylinder number, head number and sector number of the cylinder 21.

Figure 1:
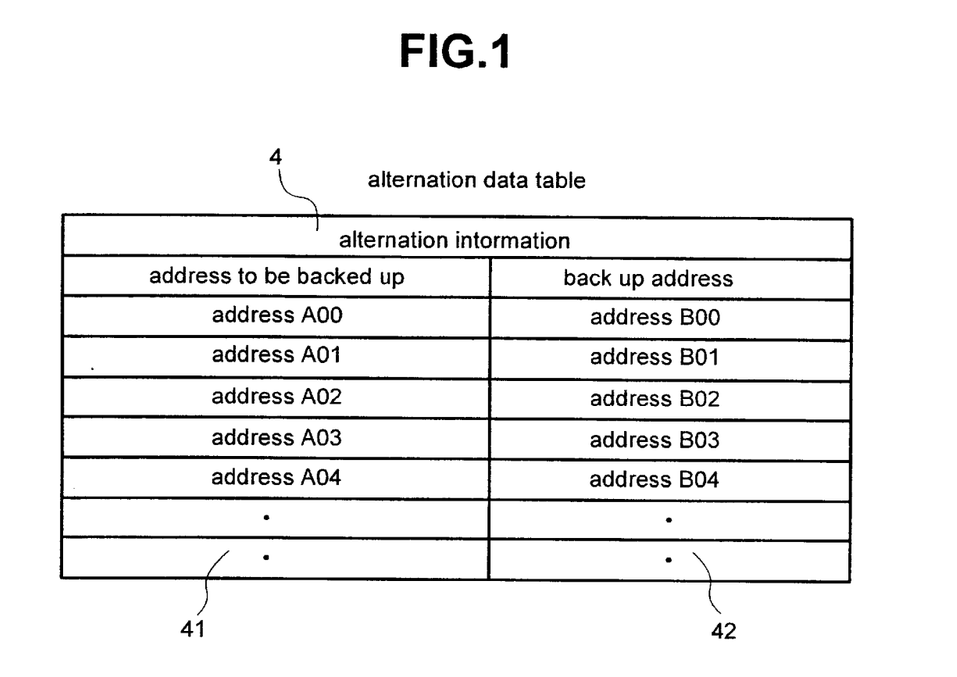
FIG. 1 illustrates an alternation data table included in the control tables of the automatic reassignment control technology of the present invention.
Figure 2:
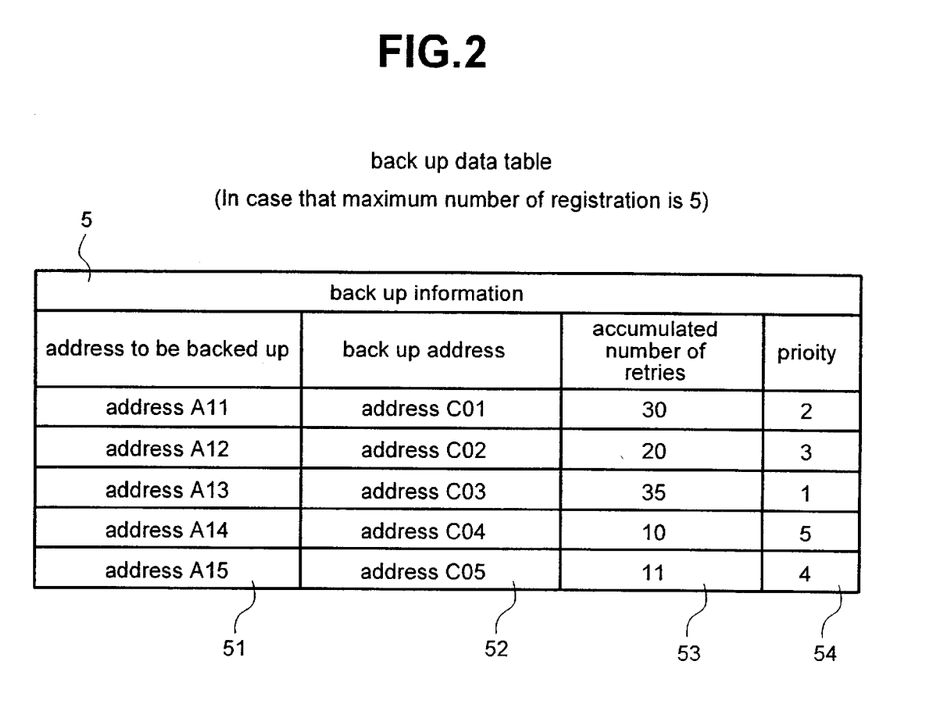
FIG. 2 illustrates a back up data table included in the control tables of the automatic reassignment control technology of the present invention.

FIG. 1 shows an example of the configuration of the alternation data table 4 and FIG. 2 shows an example of the configuration of the back up data table 5. These tables are stored in the control area 22b of the disk 2. Just after the power of the magnetic disk device is turned on, or before writing to or reading from the magnetic disk unit 2, these tables are developed and stored into the storing area of the memory 33 and the alternation processing and the back up processing are controlled using these tables. This control data can be stored in the control area 22b before power off, or at a predetermined time period after the power on of the magnetic disk device, in order to prepare for its use after the next power on.

The alternation data table 4 (FIG. 1) has a recording part 41 storing an address to be backed up and a recording part 42 storing a back up address. These addresses are configured when a defect of a sector is generated. In this regard, the address of a defective sector is registered to the recording part 41 as the address to be backed up, and an address of an alternative sector is additionally registered to the recording part 42 as a back up address in the alternation data table 4. Accordingly, the disk unit 2 can be accessed without accessing the defective sector in a writing or reading operation.

The back up data table 5 (FIG. 2) is provided with a recording part 51 storing an address to be backed up, a recording part 52 storing a back up address, a recording part 53 indicating an accumulated number of retries and a recording part 54 indicating the priority order of the entry. When a sector read from the disk 2 is judged to be a sector that has a symptom of a defect (a defect symptom sector), an address of the defect symptom sector and a back up address are registered in the backed up address recording part 51 and the back up address recording part 52, respectively. Hereby, when it suddenly becomes impossible to read the defect symptom sector at the next read timing, a read error can be avoided by reading the storage area identified by the back up address.

To avoid a deterioration of performance owing to the duplicated writing of the addresses to be backed up and the back up addresses, the number of entries to the back up data table 5 is limited, and this is controlled using the accumulated number of retries recording part 53 and the priority recording part 54. In this way, the back up data with a higher priority can always be held on the drive.

In an actual case, a second number of retries N2 (an alternation processing threshold value) and third number of retries N3 (a back up processing threshold value) are set in addition to a maximum number of retries N1 for control of the upper limit number of retries. The number of retries N2 is a parameter used to determine whether the alternation processing should be performed or not, and it is smaller than the maximum number of retries N1. The number of retries N3 is a parameter used to determine whether the back up processing should be performed or not, and it is smaller than the number of retries N2 (but N3 is not zero).

When a read error is generated at the time of reading from the disk 2, the reading process is performed again. When a retry of the reading is normally accomplished with a number of retries that exceeds the threshold value of the back up processing and that is equal to or less than the threshold value of the alternation processing, the sector is judged to be a defect symptom sector. The read sector data is written to the back up area and the back up data table 5 is updated.

When a read operation is normally performed with the number of retries exceeding the threshold value of the alternation processing, the sector is judged to be a defect sector, the read sector data is written to the alternative area and the alternation data table 4 is updated.

If normal reading cannot be performed with the number of retries reaching the maximum number of retries N1, the back up data table 5 is accessed, and when the address of the sector is registered in the recording part 51 as an address to be backed up, the sector identified by the back up address in the back up area is read. Then, the address to be backed up that cannot be read is judged to be a defective sector address, the data at the back up address is written to the alternative area, the alternation data table 4 is updated and the read unable condition is avoided. The process of updating the back up data table 5 by the implementation of the present invention is illustrated in FIG. 5 to FIG. 8. The maximum number of entries in the table 5 is 5 in this example.

Figure 5:
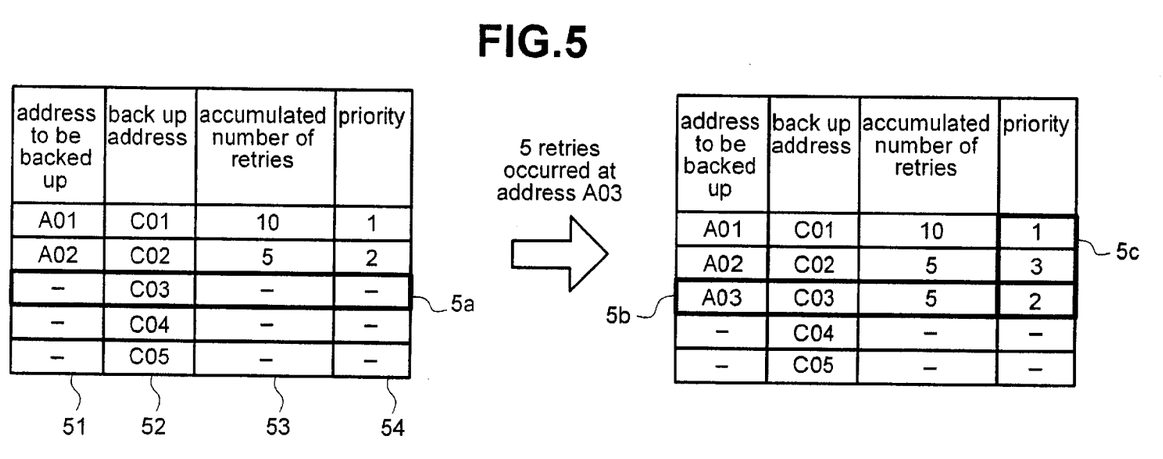
FIG. 5 is a diagram that illustrates the registration of data when there is a space in the back up data table of the present invention.

In FIG. 5, when there is room in the back up data table 5 (5a entry in the table, while 5b to 5k and 5m indicate revised entries), and when an additional entry for a defect symptom sector is needed, the address of the defect symptom sector is registered in the recording part 51 as an address to be backed up and the number of retries is registered in the recording part 53 as an accumulated number of retries (5b). The accumulated number of retries is compared to the other accumulated numbers of retries that have already been registered to the back up data table 5. If the accumulated number of retries is equal to or more than the other accumulated numbers in one or more other entries, the priority of it is set higher than the priority of those entries, and the priority recording part 54 is updated accordingly (5c). Hereby, the data of the defect symptom sector can be guaranteed.

Figure 6:
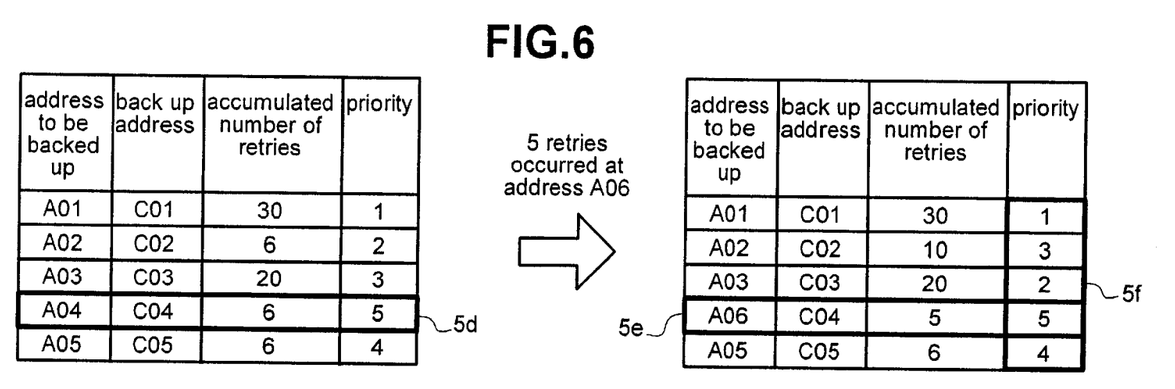
FIG. 6 is a diagram that illustrates the additional registration of the data when the back up data table of the present invention is full.

In FIG. 6, when an additional entry for a defect symptom sector is needed in the table 5 after the number of registrations reaches the maximum registration number, the registration (5d) which has the least significance in the priority recording part 54 is deleted, and the address of the new defect symptom sector is registered in the address recording part 51 as an address to be backed up and the number of retries is registered to the accumulated number of retries recording part 53 (5e). Similar to FIG. 5, the accumulated number of retries is compared to the numbers of retries that have already been registered, and when the accumulated number of retries is equal to or more than those of other accumulated numbers in one or more other entries, it is given a higher priority than the priority of those entries, and the priority recording part 54 is updated accordingly (5f). Hereby, the data of the defect symptom sector that has been recently accessed can be guaranteed.

Figure 7:
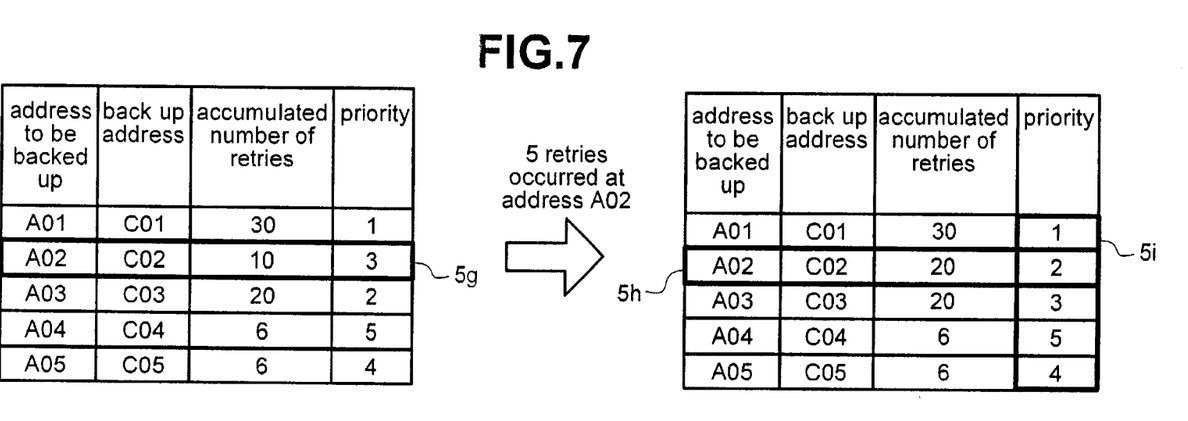
FIG. 7 is a diagram that illustrates the revising the number of retries that have already been registered to the back up data table of the present invention.

In FIG. 7, when the number of retries that is judged to be the symptom of a defect is generated at an address to be backed up (5g) that has already been registered to the back up data table 5, the recent number of retries is added to the accumulated number of retries recording part 53 (5h), and if the accumulated number of the retries is equal to or more than the other registered entries, a higher priority is set by that entry, and the priority recording part 54 is updated accordingly (5i).

Figure 8:
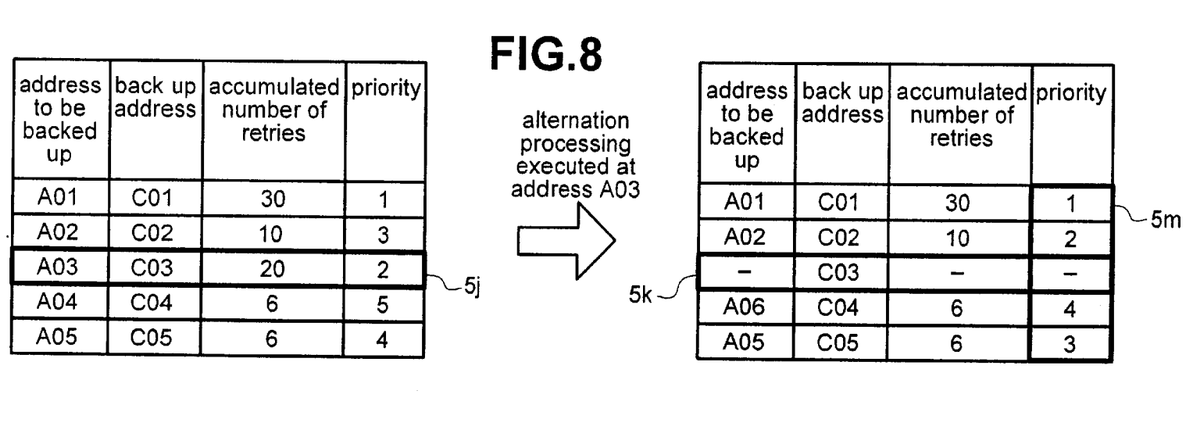
FIG. 8 is a diagram that illustrates the deletion of the address that has already been registered to the back up table of the present invention by the alternation processing.

In FIG. 8, when the number of retries exceeds the threshold value of the alternation processing at an address to be backed up (5j) that has already been registered in the back up data table 5, or when the alternation processing is generated by a read unable condition, the address of the sector to be backed up and the accumulated number of retries in the back up data table 5 are deleted from the table 5 (5k) and the alternation processing is performed. After deleting the registration, the priorities of the other entries are updated accordingly (5m). The above-described examples are based on N2>five times of retries>N3. The following is an example of an operation of the read automatic reassignment control as a preferred embodiment of the present invention.

Figure 9:
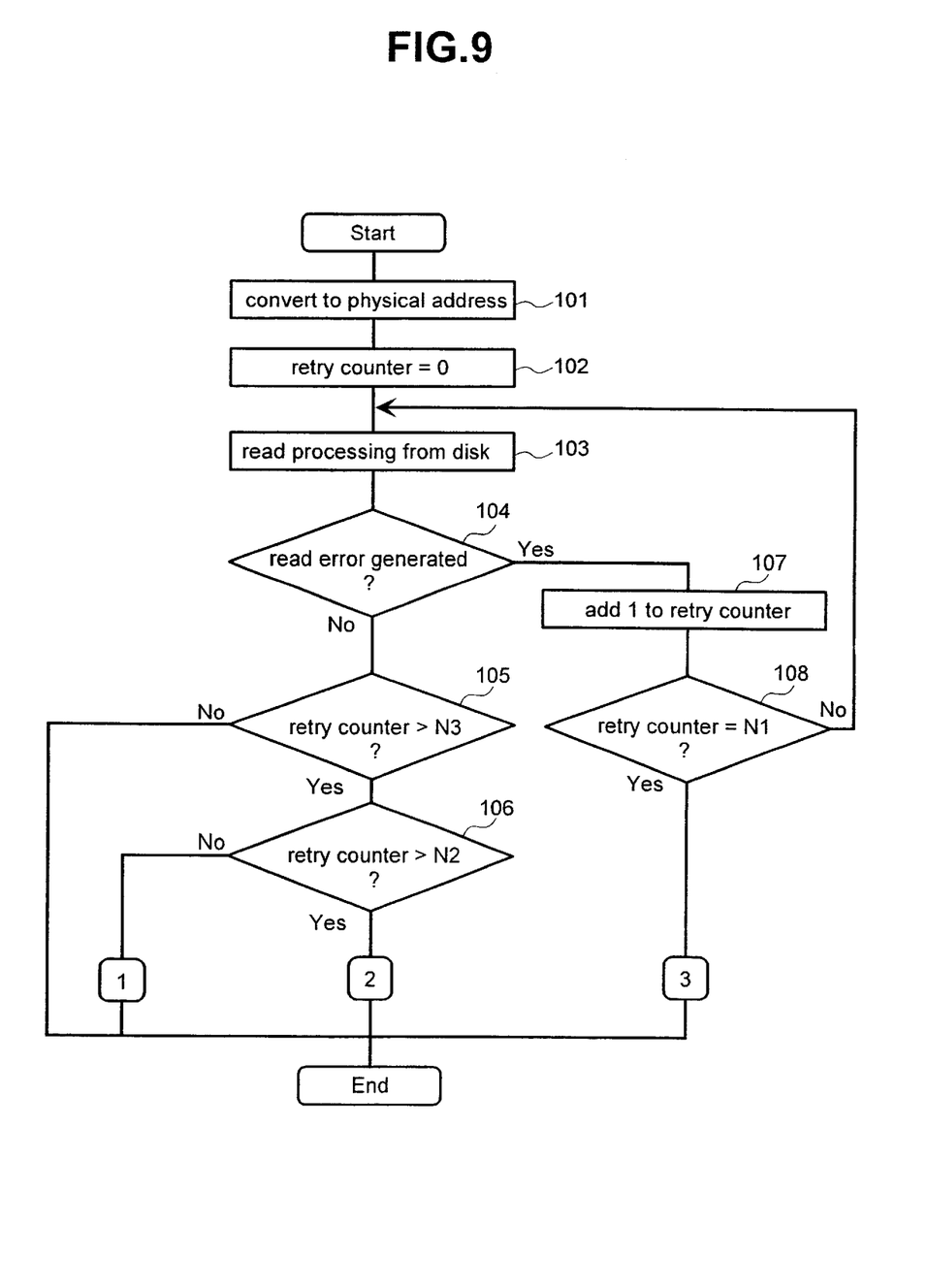
FIG. 9 is a flow chart of the process of reading user data from the magnetic disk device of the present invention.

FIG. 9 illustrates the control flow of a read processing. Host 1 (FIG. 3) requests the hard disk controller 32 to read data from the magnetic disk device 3 indicating a cylinder number, a head number and a sector number in the cylinder 21.

The magnetic disk device 3 converts a logical address from the host 1 to a physical address on the disk unit 2 to access the disk unit 2 (FIG. 9, step 101). Then it clears a retry counter to zero (step 102). After that, the data is read from the disk unit 2 (step 103), and then the data is checked to determine if a read error has been generated using the ECC etc. (step 104).

When a read error has been generated, the retry counter is incremented by 1 (step 107), a judgment is made to determine whether the retry counter has exceeded the maximum number of retries N1 or not (step 108), and, if not, the read processing (step 103) is performed again.

If the reading is indicated as having been normally performed at steps 104, the content of the retry counter is checked to see if it is larger than N3 or not (step 105). If the content of the retry counter is equal to N3 (a back up processing threshold value) or less, the read processing is not performed again (step 103), since it is determined that normal reading has been performed, and the read processing requested by the host 1 ends.

Figure 10:
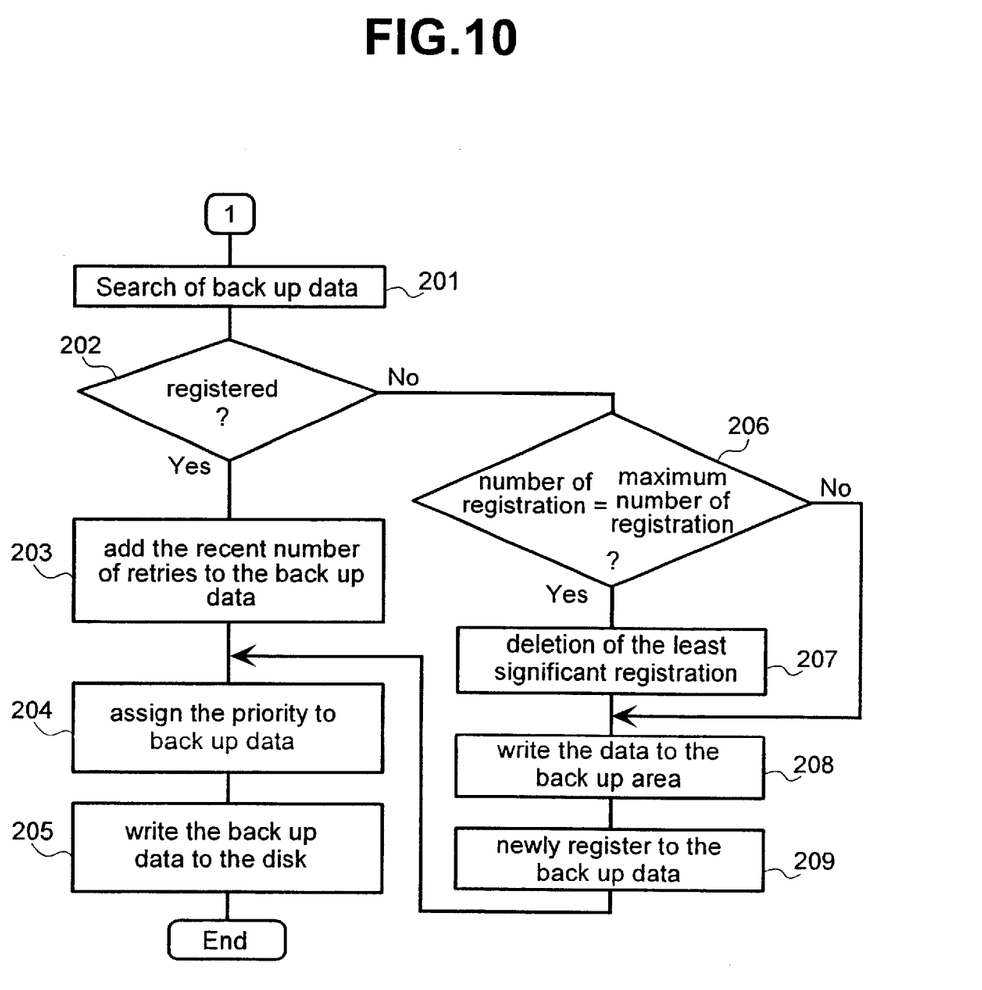
FIG. 10 is a flow chart of the process of the back up processing to the back up area.
Figure 11:
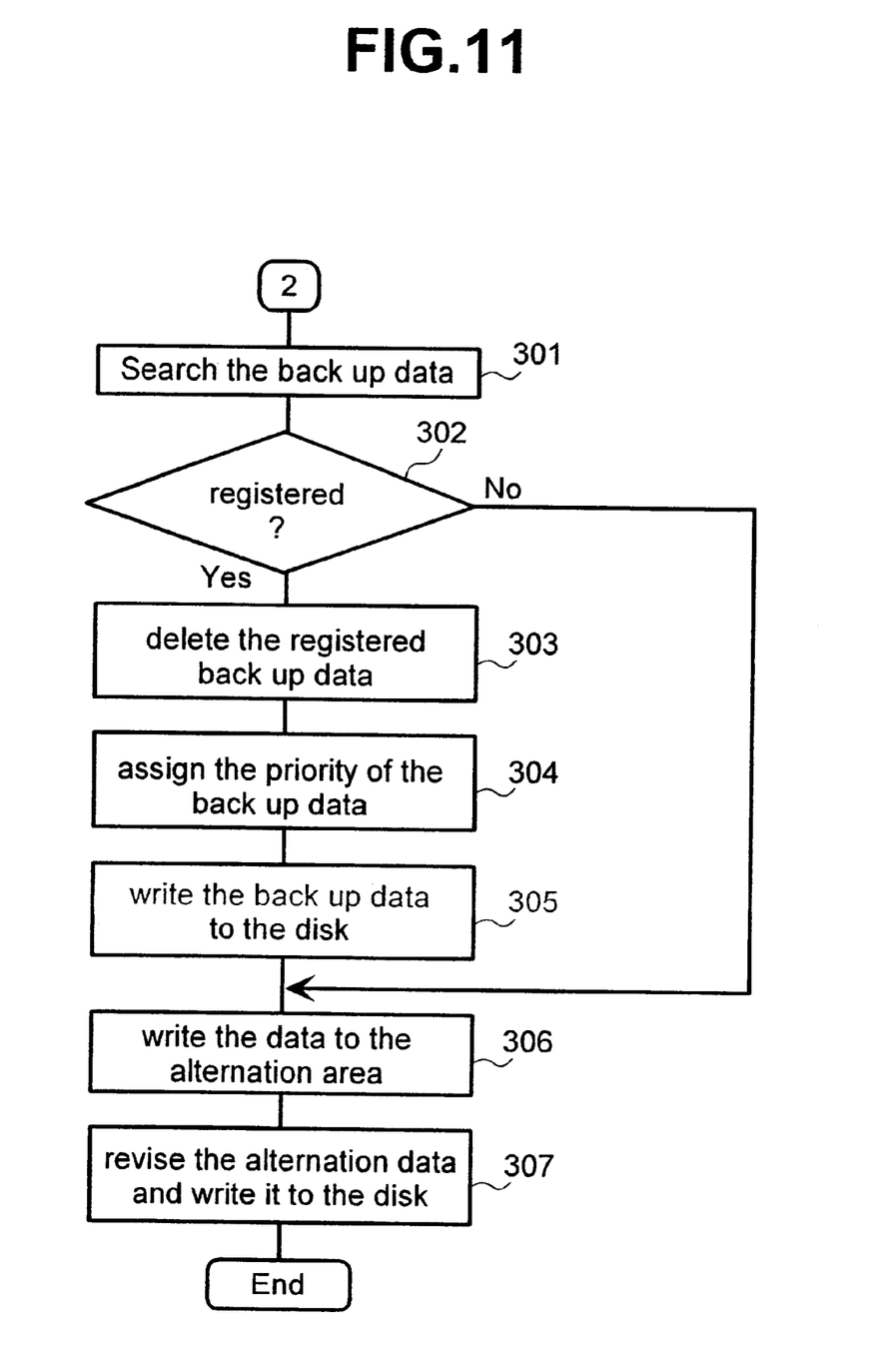
FIG. 11 is a flow chart of the process of the alternation processing to the alternation area.
Figure 12:
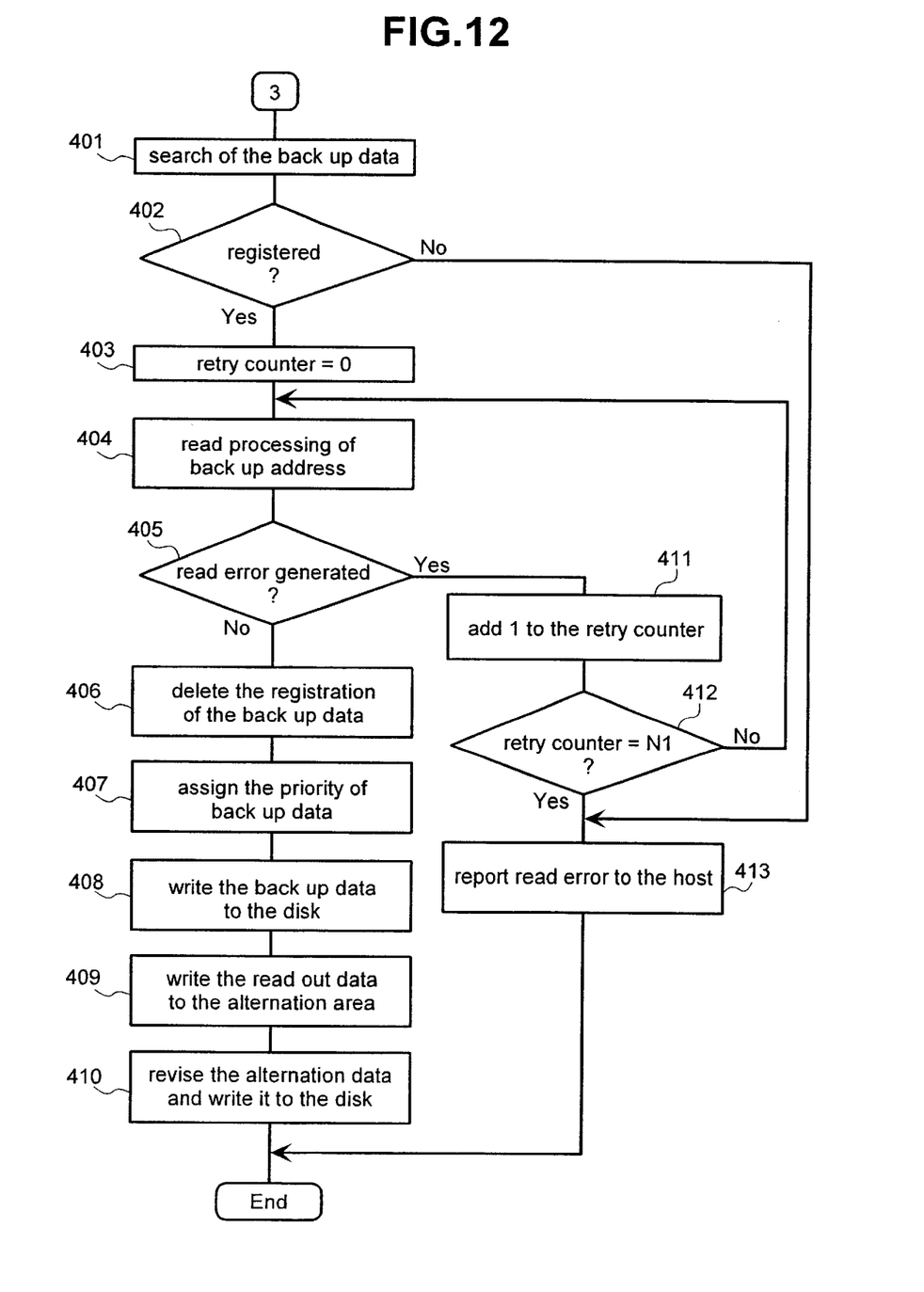
FIG. 12 is a flow chart of the process when there is data unable to be read.

If it is determined that the content of the retry counter exceeds N3 (the back up processing threshold value) at step 105, it is checked to determine whether the content of the retry counter has exceeded the alternation process threshold value (N2) or not (step 106). When the content of the retry counter is equal to or less than the alternation processing threshold value (N2), a back up processing to the back up area illustrated in FIG. 10 is performed. When the content of the retry counter exceeds N2, an alternation processing to the alternation area illustrated in FIG. 11 is performed. When the content of the retry counter reaches the maximum number of retries N1 (step 108), the processing of the read unable illustrated in FIG. 12 is performed.

The back up processing to the back up area will be explained with reference to FIG. 10.

First, a search is made to determine whether the address of a sector with an error is registered in the back up data table 5 (step 201). If it is already registered, the recent number of retries is added to the accumulated number of retries recording part 53 of the back up data table 5 (step 203). On the other hand, if it is not registered, whether the number of entries in the back up data table 5 is up to the maximum number or not is checked (step 206), and if there is no room for a new entry in the back up data table 5, the entry with the address to be backed up which has the least significant priority in the priority recording part 54 is deleted (step 207), and an area to register the content of the defect symptom sector that is newly generated, is reserved. This effects preservation with priority of the recently accessed sector. The data of the sector that is newly read is written to the back up area (step 208), the sector address is registered as an address to be backed up in recording part 51 and the number of retries is newly registered to the accumulated number of retries recording part 53 (step 209). As the accumulated number of retries is newly registered or is added to the previously registered number, the priority of the other entries is updated in the priority recording part 54 (step 204). The revised back up data table 5 is written to the back up data storing address of a disk control area (step 205).

The alternation processing to the alternation area as shown in FIG. 11 will be explained next.

First, a search is made to determine whether the sector address is registered as an entry in the back up data table 5 or not (step 301). If it has already been registered, the back up is no longer needed, since the data will be written to the alternation area. Hence, the entry of the sector address in the back up data table 5 is deleted (step 303). In order to re-establish the order of the priority caused by the deletion of the entry from back-up table 5, a revision of the priorities in the priority recording part 54 of the back up data table 5 is performed (step 304). Then, the data is written to the storing address of the back up data table 5 in the disk control area (step 305). The newly read data is written to the alternation area (step 306), the newly read sector address is registered to the address to be backed up recording part 41 of the back-up data table 4, the alternating address of the alternating area is registered to the back-up address recording part 42, and these items are written to the storing address of alternation data table 4 of the disk control area (step 307).

The processing for the case of the read unable condition illustrated will be FIG. 12 is explained.

First, a search is made to determine whether the address of a sector with an error is registered as an entry in the back up data table 5 or not (step 401, step 402). If it is not registered, the processing to report a read error to the host 1 is executed (step 413). If there is a registration in the back up data table 5, the retry counter is cleared to zero (step 403). Then, the back up address of the sector is read from the disk unit 2 (step 404), and it is determined whether an error is generated using the ECC etc. (step 405).

When the reading is performed normally, the entry of the sector address is deleted from the back up data table 5 (step 406). The priority recording part 54 of the back up data table 5 is revised (step 407), and then the data is written to the storing address of the back up data table 5 of the disk control area (step 408). The newly read data is written to the back-up area (step 409), the address to be back-up that is unable to be read is registered to the address to be back-up recording part 41 of the alternation data table 4, the back-up address of the alternation area is registered to the back-up address recording part 42, and those items are written to the storing address of the alternation data table 4 of the disk control area (step 410).

When the back up address cannot be read, the retry counter is incremented by 1 (step 411), and it is determined whether the content of the retry counter is equal to the maximum number of retries N1 or not (step 412). When it is less than N1, the process is repeated from the read processing of the back up address (step 404). When the back up address cannot be read (the number of retries reaches N1), a read error is reported to the host 1 (413).

Figure 13:
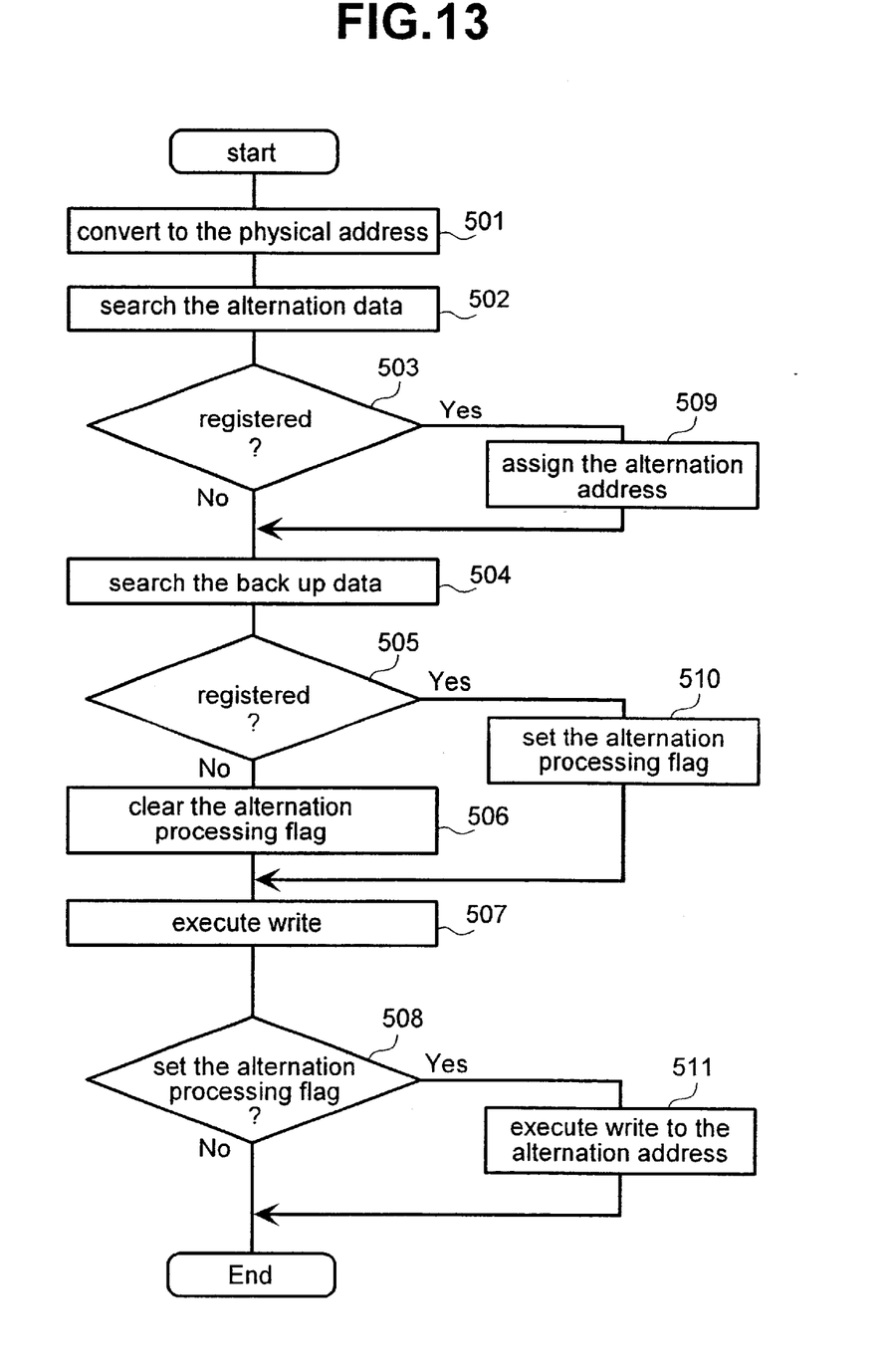
FIG. 13 is a flow chart of the process of a data write operation after the execution of back up processing and alternation processing.

An example of a write processing operation in the alternation processing and the back up processing described above will be explained. FIG. 13 illustrates the control flow of the write processing.

The host 1 sends the write request to the hard disk controller 32 in the magnetic disk device 3 indicating the cylinder number, the head number, the sector number of a cylinder 21. The magnetic disk device 3 converts a logical address to a physical address for accessing the disk unit 2 (step 501) and searches into the alternation data table 4 before writing data to the disk unit 2 (step 502).

If the address of the sector is registered in the alternation data table 4, the physical address is reassigned to the back-up address (step 509). Then, a search is made to determine whether the accessing address is registered to the back up data table 5 (step 504). When it is registered, a back up processing flag that indicates that back up processing has been executed is set to 1 (step 510). When it is not registered, the back up processing flag is set to 0, in other words, to clear the back up processing flag (step 506). Then, the write processing is executed (step 507), and when the back up processing flag is 1, the same data is written to the back up address (step 511). In this way, the data corresponding to the address to be backed up and the data of the back up address, which addresses are registered in the back up data table 5, are kept the same. Therefore, when a read error is generated at the address to be backed up, the data of the back up address can be referred to because the addresses are registered in the back up data table 5.

The present invention extends the practical life of the magnetic disk drive, suppressing an elongation of the data access time caused by retries. More specifically, because the magnetic disk device 3 of the present invention has, besides the alternation data table 4 that controls the defective sector, the back up data table 5 that keeps the address to be backed up and the back up address of the defect symptom data sector, and the back up area including the back up address to which data is backed up, the defect symptom data sector can be guaranteed.

Because the back up data table 5 has a recording part that holds the accumulated number of retries and the disk drive system can determine the priority based on the accumulated number of retries, frequently used data can be guaranteed.

In the case of a read unable condition, the condition can be avoided if the content of the sector that cannot be read is registered in the back up data table 5. Therefore, a magnetic disk device with the least possibility of losing data can be achieved.

What is claimed is:

1. An automatic read reassignment method, comprising:
   an inputting step of inputting a read command issued from a host to read desired data from a magnetic disk media;
   a retry step of retrying a read operation when an error is generated in a previous read operation; and
   a step of performing the following steps when the number of retries of the read operation is equal to a first threshold value N1, where N1 is a natural number:
   (1) a registering step of registering as an entry in a table the number of retries of the read operation in corresponding relation to an address at which the retries are performed,
   (2) a comparing step of comparing the number of retries for each entry of the table to the number of retries of the other entries of the table,
   (3) a setting step of setting priority levels of each of the entries of the table based on results of the comparing step,
   wherein an entry having the highest number of retries is set to a highest priority level and entries having the lowest number of retries is set to a lowest priority level, and
   (4) a deleting step of deleting the entry having the lowest priority level.

2. An automatic read assignment method, comprising:
   an inputting step of inputting a read command issued from a host to read desired data from a magnetic diak media;
   a retry step of retrying a read operation when an error is generated in a previous read operation; and
   a step of performing the following steps when the number of retires of the read operation is equal to a first threshold value N1, where N1 is a natural number:
   (1) a registering step of registering as an entry in a table the number of retries of the read operation in corresponding relation to an address at which the retries are performed,
   (2) a comparing step of comparing the number of retries for each entry of the table to the number of retries of the other entries of the table,
   (3) a setting step of setting priority levels of each of the entries of the table based on results of the comparing step,
   wherein an entry having the highest number of retries is set to a higest priority level and entries having the lowest number of retries is set to a lowest priority level, and
   (4) a deleting step of deleting the entry having the lowest priority level; and further comprising:
   a reporting step of reporting a read unable status to the host when the number of retries of the read operations is equal to the first threshold value N1.

3. An automatic read assignment method according to claim 1, further comprising:
   a writing step of writing data that is read out at a retry step to an alternation area when the number of retries of the read operation is larger than the first threshold value N1 but smaller than a second threshold value N2, where N2 is a natural number.

4. An automatic read assignment method according to claim 1, further comprising:
   a writing step of writing data that is read out at a retry step to a backup area when the number of retries of the read operation is larger than the second threshold value N2 but smaller than a third threshold value N3, where N3 is a natural number.

5. The automatic read reassignment method according to claim 4, further comprising:
   a step of judging that a backed up sector is unable to be read; and
   a step of issuing backed up data to the host.

6. A magnetic disk drive, comprising:
   a magnetic disk media in which data from a host is stored;
   a hard disk controller that controls a transfer of data between the host and the magnetic disk media and that controls transfer of commands between the host and the hard drive controller; and
   a microprocessor having a function of inputting a read command issued from a host to read desired data from the magnetic disk media, retrying a read operation when an error is generated in a previous read operation, and performing the following steps when the number of the retries of the read operation is equal to a first threshold value N1, where N1 is a natural number:
   (1) a registering step of registering as an entry in a table the number of retries of the read operation in corresponding relation to an address at which the retries are performed,
   (2) a comparing step of comparing the number of retries for each entry of the table to the number of retries of the other entries of the table,
   (3) a setting step of setting priority levels of each of the entries of the table based on results of the comparing step,
   wherein an entry having the highest number of retries is set to a highest priority level and an entry having the lowest number of retries is set to a lowest priority level, and
   (4) a deleting step of deleting the entry having the lowest priority level.

7. The magnetic disk drive according to claim 6, wherein said microprocessor has a further function of reporting a read unable status to be host when the number of retries of the read operation is equal to the first threshold value N1.

8. The magnetic disk drive according to claim 6, wherein said microprocessor has a further function of writing the data that is read out at a retry step to an alternation area when the number of the retries of the read operation is larger than the first threshold value N1 but smaller than a second threshold value N2, where N2 is a natural number.

9. The magnetic disk drive according to claim 6, wherein said microprocessor has a further function of writing data that is read out at a retry step to a backup area when the number of the retries of the read operation is larger than the second threshold value N2 but smaller than a third threshold value N3, where N3 is a natural number.

10. The magnetic disk drive according to claim 6, further comprising:

a memory for storing an alternation data table that stores an address of a sector with a defect and an address of an alternative sector when the sector with a defect is generated, and backup data table, corresponding to said table, that stores an address of a sector to be backed up and an address of a backup sector.

11. The magnetic disk drive according to claim 10, wherein said microprocessor has a further function of selecting a candidate of the data for transferring it to the alternation area by referring to the number of retries in the retry operation accompanying a read error, storing the candidate to the back up area that is a temporary storing area, and deciding dynamically the priority in an alternation depending on the number of retries carried out in a following retry operation.

* * * * *